United States Patent
Ottosson

[11] Patent Number: 6,051,819
[45] Date of Patent: Apr. 18, 2000

[54] METHOD AND DEVICE FOR TEMPERATURE CONTROL OF HOT TAP-WATER

[76] Inventor: Alf Ottosson, Duvvägen 17, S-141, 72 Huddinge, Sweden

[21] Appl. No.: 09/155,295

[22] PCT Filed: Mar. 24, 1997

[86] PCT No.: PCT/SE97/00509

§ 371 Date: Sep. 25, 1998

§ 102(e) Date: Sep. 25, 1998

[87] PCT Pub. No.: WO97/36138

PCT Pub. Date: Oct. 2, 1997

[30] Foreign Application Priority Data

Mar. 27, 1996 [SE] Sweden ................................. 9601181

[51] Int. Cl.[7] .................................................. H05B 1/02
[52] U.S. Cl. .......................... 219/496; 219/441; 219/471; 219/494
[58] Field of Search .................... 219/483, 494, 219/501, 505, 496, 497, 441, 471, 449; 165/287, 75

[56] References Cited

U.S. PATENT DOCUMENTS

| | | |
|---|---|---|
| 4,164,253 | 8/1979 | Skala ............................................ 165/1 |
| 4,167,663 | 9/1979 | Granzow, Jr. et al. ................. 219/497 |
| 4,243,871 | 1/1981 | McKenny ................................. 219/326 |
| 5,403,564 | 4/1995 | Katschnig et al. ..................... 422/307 |
| 5,739,505 | 4/1998 | Hasegawa et al. ..................... 219/494 |

*Primary Examiner*—Mark Paschall
*Attorney, Agent, or Firm*—Birch, Stewart, Kolasch & Birch, LLP

[57] ABSTRACT

A method and a device for controlling the temperature of hot tap-water, which is heated on the secondary side of a heat exchanger. In order to achieve a quick response and a good temperature stability, the changes of the temperature and the flow of the hot tap-water are sensed on the secondary side of the heat exchanger, these sensed variations controlling a regulator which in turn controls a setting device regulating the flow on the primary side of the heat exchanger.

8 Claims, 1 Drawing Sheet ical patent application published in WO 86/06459
METHOD AND DEVICE FOR TEMPERATURE CONTROL OF HOT TAP-WATER This application is the national phase under 35 U.S.C. §371 of prior PCT International Application No. PCT/SE97/00509 which has an International filing date of Mar. 24, 1997 which designated the United States of America, the entire contents of which are hereby incorporated by reference.

BACKGROUND OF THE INVENTION

1. Field of the Invention

The invention concerns a method and a device for controlling the temperature of hot tap-water, which is heated on the secondary side of a heat exchanger, wherein the temperature and the flow of the hot tap-water is measured and wherein a regulator controls a setting means governing the flow at the primary side of the heat exchanger.

2. Description of Related Art

Such a device is previously known from the German published patent application DE 4206074 A1, comprising, on the primary side of the heat exchanger, a closed circulating circuit including a storage container for hot water and a circulation pump. The circulation pump is controlled by a regulator in response to the temperature drop over the heat exchanger at the primary side as well as the temperature drop over the heat exchanger at the secondary side, the regulator being programmed to calculate the amount of energy which the heat exchanger must transfer per time unit. Here, another parameter being taken into account, is the flow of hot tap-water which is sensed by a flow sensor in the secondary circuit. For such a calculation, a plurality (at least four) of temperature sensors are thus required as well as associated connections to the regulator. Even so, with this known device, it is difficult to accomplish a good temperature stability in case of strongly varying consumption of hot tap-water.

Similar arrangements with heat exchangers are being used also in district central heating networks, wherein the forward and return lines of the network are connected to the primary side of the heat exchanger along with a setting means for governing the flow of municipal hot water through the heat exchanger.

In housing or the like, whether there are only a few housing units or a great number of units, the consumption of hot tap water varies strongly and relatively quickly during certain time periods each day. When the flow changes, the temperature sensor will sense such a change only upon a certain delay, when the volume of water in the secondary circuit has flown away and been replaced by fresh water which has not yet been heated to the desired set temperature. Consequently, there will be a considerable drop of the temperature of the hot tap-water before the regulator has a possibility to react and control the flow regulating valve in the primary circuit of the heat exchanger.

Accordingly, a problem which occurs when heating hot tap-water in a heat exchanger is to keep the water temperature constant when the flow thereof varies strongly. An attempt to solve this problem is described in the international patent application published in WO 86/06459 (Cairenius), where the secondary circuit is connected to a mixer, in which hot water, which has passed the heat exchanger and has been heated therein, is mixed with cold water (water which has not been heated), the mixing relation being controlled by means of a thermostat valve. Hereby, large flow variations can be permitted, but the dynamic response will nevertheless be insufficient. The measure of letting the thermostat control the setting means of the primary circuit will in principle cause the same problem as discussed above, which is due to the fact that the state of a thermostat is directly dependent on the temperature of the water flowing in the secondary circuit.

In still another known device, disclosed in the Swedish patent specification SE-B-328 388 (Overgaard), the consumer water is heated in a heat exchanger, the primary side of which is connected to a district central heating network. Here, one has chosen to dispense with the thermostat valve or a corresponding temperature sensor in the consumption water circuit (the hot tap-water). Instead, there is a flow sensor which directly controls a valve in the line connected to the central heating network. A fluctuation in the flow of hot tap-water will cause a quick response, but the absolute temperature of the hot tap water is not controlled at all and may vary with different parameters, such as the temperature of the incoming consumer water, the temperature of the water in the central heating network, etc.

SUMMARY OF THE INVENTION

Against this background, the present invention aims at providing a quicker and more reliable control of the temperature of hot tap-water being heated in a heat exchanger, so that the temperature of the hot tap-water may be kept substantially constant with relatively small fluctuations, even when the flow is changing quickly. Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The invention will now be explained more fully below with reference to the appended drawings illustrating two embodiments.

DESCRIPTION OF THE PREFERRED EMBODIMENTS

Figure 1:
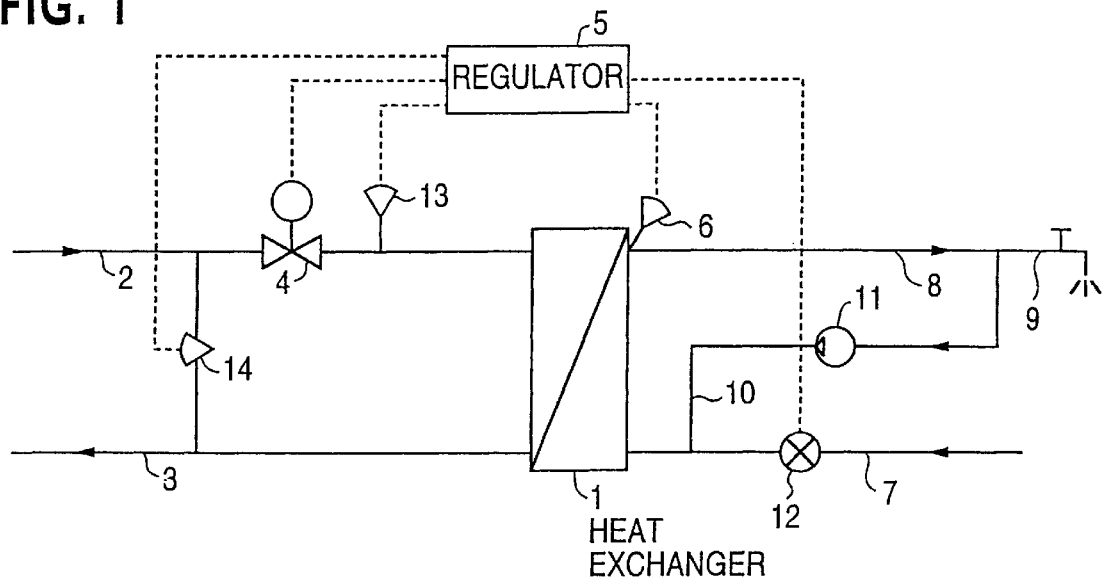
FIG. 1 illustrates schematically a control device according to the invention according to a first embodiment.

In FIG. 1, there is shown a heat exchanger 1, the primary side of which is connected to a district central heating network with a forward line 2 and a return line 3. In the forward line 2, there is a flow regulating valve 4, which is controlled by a regulator 5 in response to a signal from a temperature sensor 6, which is disposed in the secondary circuit for hot tap-water of the heat exchanger 1. This secondary circuit includes a feed line 7 for consumption water and an outlet line 8 for heated consumption water, i.e. hot tap-water. This outlet line is assumed to be connected to a plurality of water taps in a building (only one such tap 9 is shown on the drawing). A steady flow through the heat exchanger is maintained by means of a shunt line 10 provided with a circulation pump 11.

The system described so far is basically of a kind which is previously known per se.

According to the invention a temperature sensor 6 is provided in the outlet line 8 of the secondary circuit, preferably adjacent to the heat exchanger 1, and is adapted to sense the momentary temperature variations of the water in the outlet line.

Furthermore, a flow sensor 12 is provided in the secondary circuit, preferably in the feed line 7, so as to measure the relative flow fluctuations within a given, preset load range. This flow sensor is also connected to the regulator 5 which is adapted to control the flow regulating valve 4 in the primary circuit already before the temperature in the outlet line 8 has dropped or risen upon a sudden increase or decrease of the flow of hot tap-water. Hereby, the settling process can be considerably attenuated, and the temperature of the hot tap-water can be kept substantially constant or at least within narrow limits even when the hot tap-water flow varies strongly.

Upon momentary load changes, being sensed by the flow sensor 12 and, with a certain delay, by the temperature sensor 6, the flow regulating valve 4 will thus change its position, primarily in response to the size of the relative flow change but also with a certain consideration to the thermodynamic properties of the overall system. This positional change of the valve 4 is thus determined by an algorithm being adapted to the particular system. The algorithm will calculate the size of the positional change on the basis of the change in energy demand for the supplied non-heated consumption water with due account taken of the dynamic properties of the system.

In systems with large variations of the temperature in the forward line 2 and/or the pressure difference between the forward line 2 and the return line 3, a temperature sensor 13 and/or a differential pressure sensor 14 may be disposed for an automatic adaptation of the algorithm of the regulator.

Measurements in residential buildings have shown that the average consumption (for a period of 24 hours) of the hot tap-water constitute about 20% of the top level. This top level occurs during an accumulated relatively short time period of about 5 minutes, the peaks being very short and the flow variations thus being very strong. In spite of this fact, it is possible to keep a temperature stability of ±2° C. with the control device of the present invention even if the system is dimensioned on the basis of the accumulated or average consumption rather than the top consumption.

Therefore, the invention will enable a considerable saving of the investment cost of the system as well as an improved temperature stability of the hot tap-water, thanks to the simple structure and the quick response of the control device. In principle, it is sufficient with only one flow sensor and only one temperature sensor.

Figure 2:
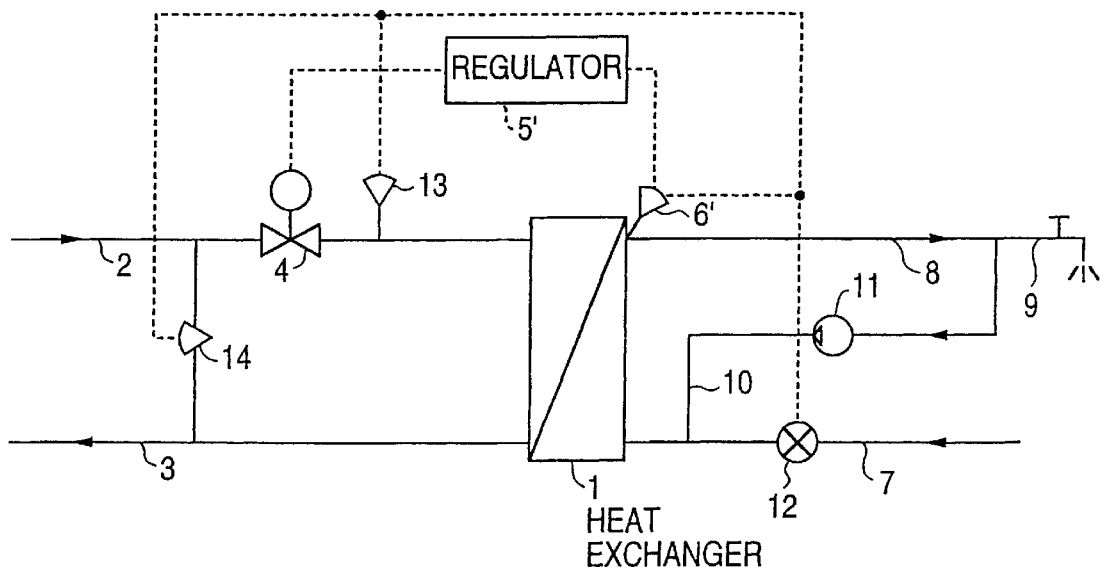
FIG. 2 shows schematically a second embodiment.

In FIG. 2, there is shown a simplified embodiment, where the same reference numerals designate equivalent components as in FIG. 1. The only difference is that the flow sensor 12, the temperature sensor 13 and the differential pressure sensor 14 are connected to the temperature sensor 6', which will pass on a corrected sensor signal to the regulator 5'. Upon an increased flow, the temperature sensor will deliver a signal corresponding to a lower temperature than the temperature being sensed. Such an embodiment is especially suitable as a supplement to existing systems in that only the sensors 12, 13, 14, 6', but not the regulator 5', has to be replaced (or supplemented).

Those skilled in the art can carry out the invention in many different ways within the scope of the appended claims. E.g. the heat exchanger may consist of a unit including two or more heat exchangers connected in series and/or in parallel to each other. The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method of controlling the temperature of hot tap-water in a building having a plurality of hot water taps, the tap-water being heated on a secondary side of a heat exchanger, wherein the temperature and the flow of the hot tap-water are measured and wherein a regulator controls a setting means governing the flow on a primary side of the heat exchanger, said method comprising the steps of:

sensing, on the secondary side of the heat exchanger, the temperature variations of the hot tap-water at an outlet side of the heat exchanger as well as the momentary, relative flow changes of the hot tap-water; and controlling said setting means with said regulator in response to the size of the momentary sensed variations in order to keep a predetermined temperature stability of the hot tap-water.

2. A method as defined in claim 1, further comprising the step of transferring a sensor signal, corresponding to the sensed momentary, relative flow change, to a sensor sensing the temperature of the hot tap water at the outlet side of the heat exchanger, so that upon an increased hot tap-water flow there will be delivered a temperature sensor signal, corresponding to a lower temperature than the one being sensed, to the regulator.

3. A method as defined in claim 1, wherein the water temperature on the primary side of the heat exchanger is also sensed, this water temperature being also used to control said regulator and said setting means.

4. A method as defined in of claim 1, wherein the pressure difference on the primary side of the heat exchanger is also sensed, this pressure difference being also used to control said regulator and said setting means.

5. A control device for controlling the temperature of hot tap-water, wherein a heat exchanger is arranged to transfer heat from a primary circuit, being provided with a flow regulating setting means, to a hot tap-water circuit serving as a secondary circuit, which is provided with a temperature sensor controlling said setting means via a regulator for keeping the temperature of the hot tap-water constant, comprising a flow sensor provided in said secondary circuit for hot tap-water, said flow sensor being adapted to sense momentary, relative flow changes and to control said regulator in response thereto, said regulator being controlled by temperature variations sensed by said temperature sensor which is disposed in the secondary circuit on an outlet side of the heat exchanger.

6. A control device as defined in claim 5, wherein said flow sensor is connected to said temperature sensor.

7. A control device as defined in claim 5, wherein a further temperature sensor is disposed at an inlet of the primary circuit of the heat exchanger, said further temperature sensor being adapted to control said regulator.

8. A control device as defined in claim 5, wherein a pressure difference sensor is disposed between a forward line and a return line in the primary circuit, said pressure difference sensor being adapted to control said regulator.

* * * * *